United States Patent [19]
Amster et al.

[11] 3,802,824
[45] Apr. 9, 1974

[54] APPARATUS FOR FORMING AN ANNULUS OF DOUGH USED FOR BAGELS AND THE LIKE

[76] Inventors: Martin J. Amster, 243 Willow Way, Clark, N.J. 07066; Murray Amster, 25 Cunningham Dr., West Orange, N.J. 07052; Joseph J. Przybylski, 223 Main St., South Amboy, N.J. 08879

[22] Filed: June 28, 1972

[21] Appl. No.: 267,009

[52] U.S. Cl.................. 425/371, 425/230, 425/231, 425/364 B
[51] Int. Cl............................................ A21c 11/00
[58] Field of Search............425/371, 393, 329, 225, 425/231, 230, 328

[56] References Cited
UNITED STATES PATENTS

| | | | |
|---|---|---|---|
| 3,379,142 | 4/1968 | Reiter et al. | 425/237 |
| 3,080,831 | 3/1963 | Paitchell et al. | 425/329 |
| 2,628,578 | 2/1953 | Roth | 425/329 |
| 2,584,514 | 2/1952 | Thompson | 425/364 |
| 3,407,754 | 10/1968 | Wichinsky | 425/374 |
| 2,666,398 | 1/1954 | Gendler et al. | 425/230 |
| 2,817,875 | 12/1957 | Harris et al. | 425/329 |

*Primary Examiner*—J. Spencer Overholser
*Assistant Examiner*—David S. Safran

[57] ABSTRACT

There is disclosed apparatus for automatically forming an annulus of dough commonly referred to as "bagel." The apparatus includes first and second flexible continuous conveyor belts. The first belt is positioned above a mandrel and the second belt is positioned below a mandrel. Each belt is associated with two rotatable drums and is directed around the outside surfaces of these drums. Surrounding the mandrel is a cylindrical member having a first semicircular cross sectional portion and a second circular cross sectional portion. The belts are further directed through the inside hollow of the cylindrical member, each assuming a cross sectional shape of a semicircle within the confines of the cylinder. The belts serve to propel a piece of dough along the mandrel and within the cylinder to knead the dough to cause the same to assume an annular form at the dough outlet portion of the apparatus.

19 Claims, 7 Drawing Figures

PATENTED APR 9 1974 3,802,824

APPARATUS FOR FORMING AN ANNULUS OF DOUGH USED FOR BAGELS AND THE LIKE

BACKGROUND OF THE INVENTION

This invention relates to apparatus for automatically forming an annulus of dough and more particularly to an apparatus for forming dough into a toroid for use in bagel baking.

Presently there exists a number of machines which are used for automatically forming dough into raw bagels. Such bagels are bakery goods which resemble doughnuts, but are fabricated from a different consistency dough. The dough used in the bagel industry is comparatively stiff and less flexible than doughnut dough and is relatively plastic in nature. Such dough cannot be excessively worked prior to or during the formation of the annular ring as there will be an insufficient rise of the dough during the baking process and a poorer product.

Furthermore, due to the nature of the dough, it is particularly susceptable to adhering to machine parts, which are used in automatic bagel formation. The prior art describes a relatively large number of automatic bagel forming apparatus used to alleviate different problems. Needless to say, a great many bakers still employ manual processes and form the bagel annulus by hand. These techniques, besides being time consuming, are unsanitary and do not produce a uniform product.

The earliest attempts in fabricating such apparatus basically formed a cylinder of dough, wrapped the cylinder about a mandrel having a circular cross section, and joined the opposite ends of the dough cylinder together by high-speed rotating discs and so on. An example of such apparatus is given with reference to U.S. Pat. No. 1,755,921 entitled "Bagel Forming Machine" issued on Apr. 22, 1930 to Louis Gendler.

This machine had many disadvantages in regard to construction, bagel formation and so on, and was relatively complicated and difficult to implement. Subsequent apparatus attempted to improve the techniques, such apparatus still used cylinders of dough, forced the same about a mandrel and used split molds for forming the annulus. The dough was further rotated to intermesh the overlapped ends to form the toroid.

These machines as the one described in U.S. Pat. No. 2,584,514 entitled "Apparatus for Making a Toroid" issued Feb. 5, 1952 to Meyer Thompson et al. was as complicated and as difficult to operate and fabricate as those above described. The major disadvantages again being the complicated machine parts, onto which parts of dough would accumulate and build up, making reliable operation, cleaning and maintenance difficult, while still necessitating the formation of a cylinder of dough prior to toroid fabrication.

The need for reliable, efficient apparatus was still paramount and various other schemes were improvised with little commercial success. Such apparatus as U.S. Pat. No. 2,666,398 entitled "Automatic Machine for Forming Bagel Dough Rings" issued on Jan. 19, 1954 to Louis Gendler et al. used similar techniques as described above in the first Gendler patent with alternate methods of joining the cylindrical ends of the dough. The machines were still complicated and inefficient, as cleaning and reliable operation was extremely difficult.

A relatively improved apparatus was developed as shown in U.S. Pat. No. 3,031,979 reissued U.S. Pat. No. Re 25,536 issued on Mar. 10, 1964 and entitled "Apparatus for Making an Annulus" by Daniel T. Thompson. These machines did not require prefabricated cylindrical dough members, but used preformed balls or spheres of dough thus eliminating a working step in the machine cycle.

The machines used a plurality of annulus forming cups carried by link-chain transports. These cups essentially acted as molds to form the outside of the bagel while the central aperture was formed by pushing or moving the dough about the mandrel. While such machines were an improvement they were expensive to build, they were difficult to maintain, were noisy in operation and suffered in reliability due to mechanical complexity. The cups broke, or became covered with dough, requiring frequent cleaning and maintenance resulting in prolonged periods during which the machine could not be used. This cup technique was employed in various other machines, while improvements were made to the central mandrel and so on. See for example U.S. Pat. No. 3,247,808 entitled "Methods of Making an Annulus" by P.T. Thompson issued on Apr. 26, 1966 and U.S. Pat No. 3,379,142 entitled "Bagel Making Apparatus" by B.W. Reiter et al. issued on Apr. 23, 1968.

Apparatus departing from the cup transport approach was described in U.S. Pat. No. 3,407,754 entitled "Dough Kneading Machine for the Forming of a Bagel and the Like" issued on Oct. 29, 1968 to L. Wichinsky.

This apparatus contemplated a simpler structure which preformed a ball of dough into a cylinder and then by means of a continuous, flexible conveyor belt forced the same about a fixed mandrel. The conveyor belt was forced to assume a circular cross section being forced through a tube. This resulting in dough accumulation within the tube, extreme stress on the belt, and resultant fracturing of the same. Another difficulty experienced was that the ends of the dough cylinder were not reliably connected and hence the output product was not a complete bagel as the attempt to join the ends was unsuccessful. Since the cylinder was closed, cleaning and maintenance still proved to be a problem.

In spite of the research, there presently exists the need for a reliable, inexpensive machine for forming bagels. There is also a need for a machine capable of forming bagels of different outside dimensions without complicated reworking of machine parts. This is necessary as bagels are used for many purposes, as sandwich material, with lunch, dinner and so on. The dough determines the taste, while the particular meal or need determines the size. A major factor is the desire for a machine which can be easily cleaned, maintained and serviced, while being safe to operate and inexpensive to manufacture.

DESCRIPTION OF PREFERRED EMBODIMENT OF INVENTION

The above problems are alleviated by an automatic apparatus for forming an annulus of dough which comprises first and second flexible, continuous, conveyor belts of a predetermined length, each directed along a different translatory path between respective pairs of belt accommodating rotatable cylindrical members, said first belt positioned above said second belt and relatively parallel thereto; a tubular cylindrical member has a first portion of a semi circular cross section and a second portion of a full circular cross section, said second belt being directed through said first and second portions to assume said semi circular configuration. Said first belt directed only through said second portion to assume an inserted semi circular configuration when compared to that configuration of said second belt; said first and second belts abutting within said second portion to assume a composite circular configuration; a mandrel is symmetrically positioned within the hollow confines of said cylindrical member and functions to shape a piece of dough introduced on said second belt and propelled thereby and subsequently propelled by both first and second belts and shaped by said mandrel and said cylindrical member to form an annulus.

BRIEF DESCRIPTION OF DRAWINGS

Referring to FIG. 1 there is shown a perspective view of a bagel making apparatus according to this invention. Before explaining this invention in greater detail, a few comments with regard to FIG. 1 will be made. The bagel machine employs two identical structures on the right and left sides. The structures such as the drums 24 and 25 are driven by means of the same motor employing a common drive gear mechanism.

As shown in FIG. 1 the unit includes two belts 21 and 22, on each side, which are transported along translatory paths. Each belt along the path is directed through a cylindrical member 35 which member has a first portion of a semicircular cross section and a second portion of a full circular cross section. The lower belt 22 engages and coacts with both portions of the cylinder 35, as will be explained subsequently. Within the hollow confines of the cylinder 35 is a mandrel 44 which as will be explained is used to shape the dough into an annulus. The cylinder 35 is capable of being separated by means of the blocks 72 in conjunction with the turn screws 73. Each belt 21 and 22 has a greater length than required by the translatory path and as such is tensioned by means of idler rollers 53 by a common tensioning apparatus as will be explained. A hopper 16 is shown in phantom and is used to accommodate a dough piece 20 for insertion onto the lower belt 22.

Referring to FIG. 2 there is shown a side elevational view of an automatic bagel making machine. As will be explained further, the other side of the machine, not shown in this Figure, has the identical apparatus as shown on this side, all of which are driven by the common motor assembly 15 and associated gear drive mechanisms.

Figure 1:
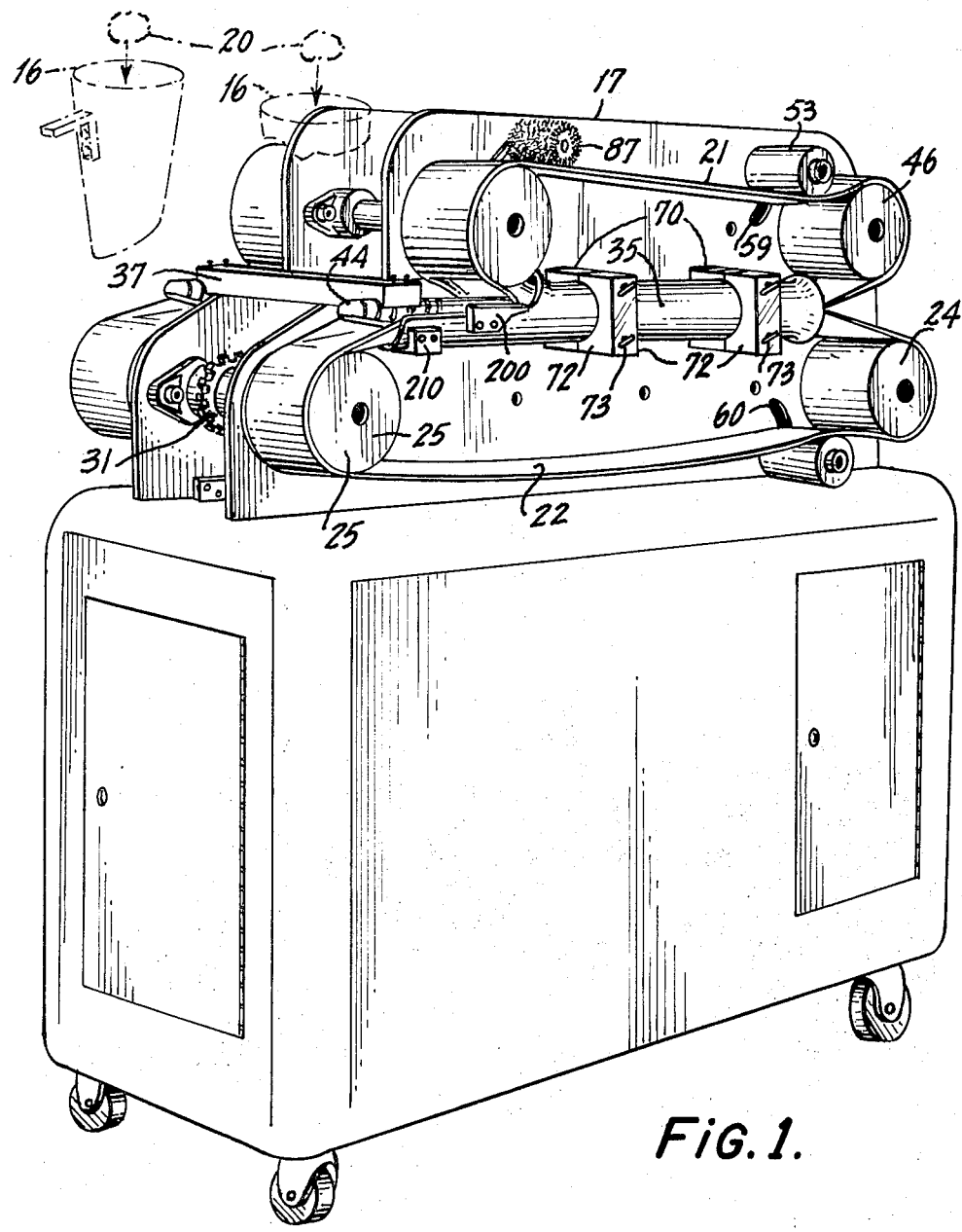
FIG. 1 shows a perspective view of an automatic bagel forming apparatus according to this invention.

The bagel making machine includes a hopper or dough accommodating container 16 which is rigidly mounted to the main frame assembly 17 of the machine by means of an extension arm 18. The hopper can accommodate a plurality of irregularly shaped pieces of dough 20. The shape of the dough pieces is not important as they can be spherical in nature or irregularly shaped and so on as long as the total volume and weight is appropriate to fabricate one bagel. The hopper 16 is located at the dough receiving end of the apparatus.

There is shown two flexible, continuous conveyor belts 21 and 22 which may be fabricated from a neoprene rubber or some other suitable elastomeric material. The lower belt 22 as can be seen is longer than the upper belt 21. The lower continuous belt encircles a first drum 24 and a second drum 25 to thereby define a translatory path. The drums 24 and 25 may be fabricated from steel or aluminum and can be solid or hollow cylindrical members. The drum 24 is driven by the motor 15 by means of a chain 26 which engages a sprocket gear assembly 27 attached to a drive shaft 28 which is rigidly coupled to the drum 24, and rotatably mounted on the frame assembly 17. Another sprocket gear accommodates a second chain assembly 30 which drives the drum 25 by coacting with the sprocket gear 31. The sprocket gear 31 likewise is coupled to a drive shaft 32 associated with drum 25. In this manner, the motor 15 drives both drums 24 and 25 in a clockwise direction thus moving the belt in a direction to direct the dough 20 from the receiving end to the outlet end. The surfaces of the drums may include a lagging material or be roughened to provide a frictional surface for firmly engaging the conveyor belt 22 to enable efficient drive.

The conveyor belt 22 as shown is also direced through a cylindrical member 35. The cylindrical member or section 35 has a dough receiving end which has a flared front end 36 and is a half cylinder having a semicircular cross section up to the line referenced by number 40. At this line 40, the member 35 assumes a full cylindrical shape having a full circular cross section. Located within and surrounded by the cylindrical section 35 is a mandrel 42.

The mandrel 42 has a dough receiving end 43 not surrounded by the member 35, which includes a plurality of surface channels or grooves 44. The channels 44 may be machined indentations on the mandrel surface and serve to provide a greater surface area for the piece of dough 20 intorduced on to the belt 22 via the hopper 16. These surface indentations 44 assure that the dough 20 will be propelled into the apparatus and afford easy movement for the same. The mandrel 42 is held in position by means of a block 37 which block 37 is rigidly secured to the frame assembly 17. The mandrel 35 also includes a kneading portion 45 which as shown consists of a series of different diameter tapers. The function of these tapers is to aid in connecting or joining the ends of the dough to form an annular structure as will be explained. It is noted, however, that the particular shape and structure of the kneading surface 45 is not important to accomplish this result, and many alternative surface configurations can be used as well; as notches or grooves along the mandrel. Basically, the diameter of the mandrel 35 prior to the kneading section 45 is less than the diameter of the mandrel after the kneading portion. The mandrel 42 undergoes a further reduction in size near the dough exit end of the machine as is shown in the figure. but The top conveyor belt 21 is of a shorter length than the bottom conveyor belt 22 and encircles drums 46 and 47. Drum 46 is driven by means of a main gear 48, the teeth of which coact with the teeth of the gear 50. The main gear 48 is connected to the drive shaft 28 and is therefore driven directly by motor 15 via the chain drive 26. A central shaft 51 couples the gear 50 to the drum 46 and therefore drives the same. Because of the translation afforded by the gear coupling, drum 46 is driven counter-clockwise or opposite to drum 24. Drum 47 is not direct driven, but essentially is an idler drum and is driven by drum 46 by means of the belt 21. As previously indicated, the surfaces of the drums 46 and 47 may also include a lagging or a roughened surface to provide a firm gripping area and therefore an easy driving capability by means of the belt 21. Both drums 46 and 47 are therefore driven counterclockwise to cause belt 21 to push or propel the dough 20 in the same direction through the apparatus as does belt 22. The belt 21 is also introduced into cylindrical member 35 at the point designated by reference line 40.

As indicated, the belt entrance portions of the semicircular cylindrical configuration and the circular configuration of cylinder 35 are flared to prevent wearing of the belts and undue frictional forces on the belts. Both the belts 21 and 22 are directed through the cylinder 35 are forced to assume a semicircular cross sectional configuration within the confines of the cylindrical member 35. The belt 22 is preformed into the semicircular configuration prior to its entrance into the full cylindrical section of member 35 due to the half cylindrical section. For example, the internal diameter of the cylindrical member 35 may be 3 inches while the width of the belt may be in excess of 4.3 inches. The internal diameter of the cylinder determines the amount of curvature or bend afforded to the flexible belts 21 and 22. The width of the belt assures that that edges of the belts within the cylinder abutt each other to thereby form a circular configuration within the full cylindrical section of member 35.

Figure 4:
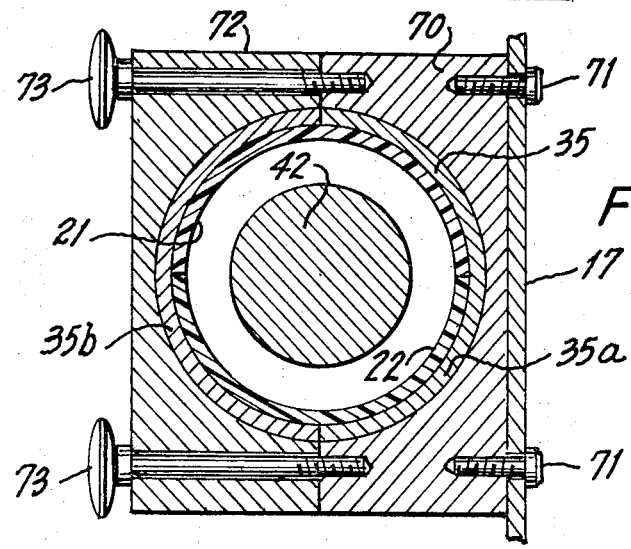
FIG. 4 is a front cross sectional view showing the cylinder and mandrel taken through line 4—4 of FIG. 2.

The belts are tensioned by means of idlers 53 and 54. The idlers 53 and 54 are respectively rotatably mounted on shafts 55 and 56 which shafts are attached to pivotable lever arms 57 and 58. The shafts 55 and 56 and the idlers 53 and 54 are further constrained in limited vertical and lateral movement by means of the slots 59 and 60 in the frame assembly 17. As will be described in conjunction with FIG. 4, this assembly provides a unique tensioning scheme for the belts 21 and 22, and for two additional belts used in apparatus on the other side of the frame assembly. The idlers 55 and 56 assure that the proper tension is exerted on the belts 21 and 22 to make up for belt slack, while the mechanism coupled to these idlers permits easy release of the idlers. This action, as will be explained, thereby frees the oversized belts for purposes of machine maintenance and machine cleaning.

Figure 5:
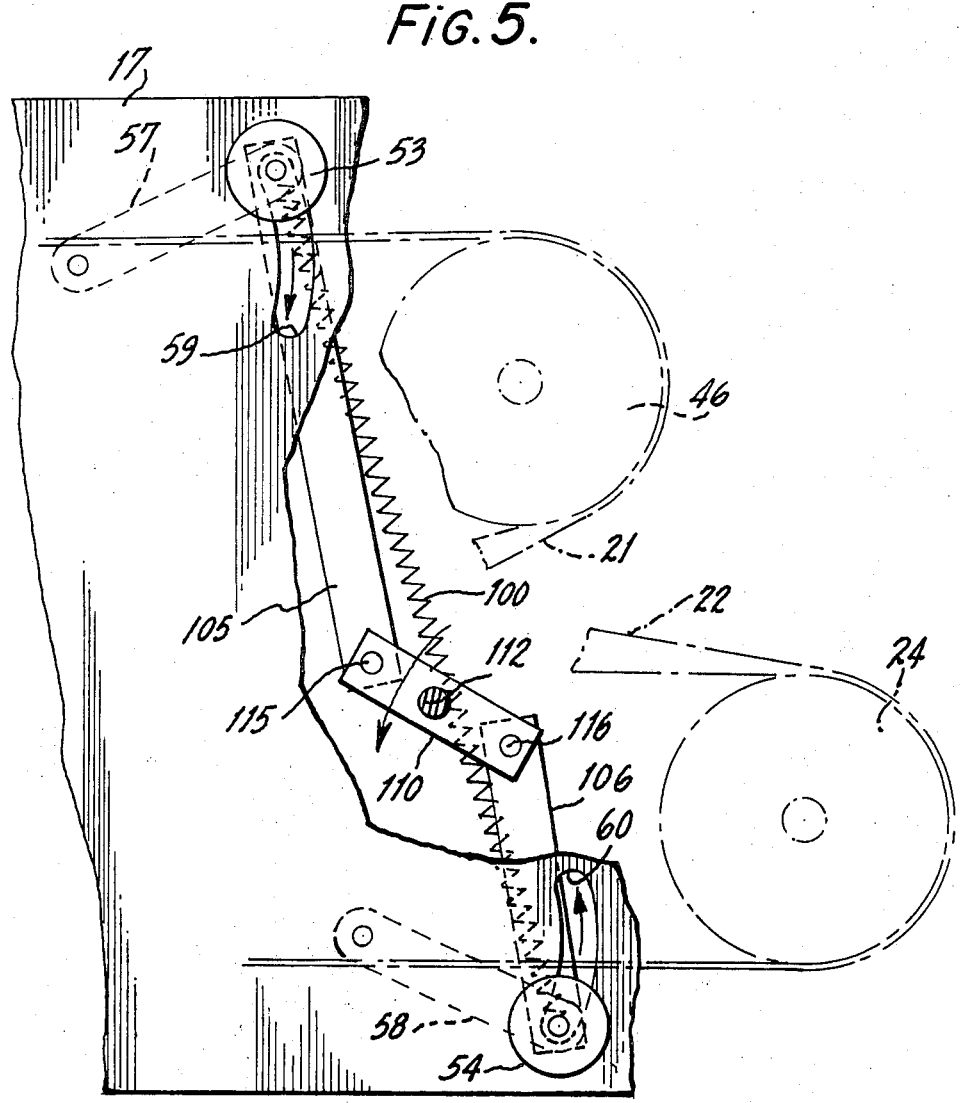
FIG. 5 is an elevational view of a tensioning apparatus utilized with the apparatus of this invention.

In regard to maintenance of the machine, the cylindrical member 35 is fabricated in two sections as is more particularly shown in FIG. 5. FIG. 5 is a cross sectional view taken through line 5—5 of FIG. 2. As can be seen the mandrel 42 is centrally located and is surrounded by the cylindrical member 35. The cylindrical member 35 is fabricated in two sections designated as 35A and 35B respectively. Basically, each section is a C shaped member and in essence is the mirror image of the other section. The C shaped section 35A is secured to a block 70 which is rigidly secured to the machine frame 17 by rivets or other suitable fastening means 71. The outside C shaped member 35B is also secured to a cooperating block member 72. Member 72 has two or more apertures located on the front surface thereof for accommodating easy grip screw assemblies 73 such as those having large "wing-type" heads. The screw assemblies 73, as located within the apertures, serve to fasten block 72 to block 70 and therefore serve to hold the two C shaped members together to thereby form the composite cylindrical member 35. A clip member 210 is also shown in FIG. 2 and serves to hold the semicircular portion securely together when the belt 22 is being driven therethrough.

Again, referring to FIG. 2 it is shown that there are at least two block members 72 which are spaced apart at suitable intervals along the cylindrical member 35 to afford mechanical strength to the composite assembly. Hence the operator of such equipment has a relatively easy job of separating the cylindrical member halves 35A and 35B by simply removing the thumb screws 73. This enables him to remove the entire half cylinder or C shaped section 35B. Removal permits easy access to the internal confines of the cylindrical member 35, therefore enabling easy maintenance and cleaning of both the cylindrical member 35 and the mandrel 42. It is also noted that the idlers 54 and 55 can also be easily released during the cleaning process and therefore maintenance of the machine is not interfered with by the belt assemblies 21 and 22. This aspect of the apparatus will be explained further.

Figure 2:
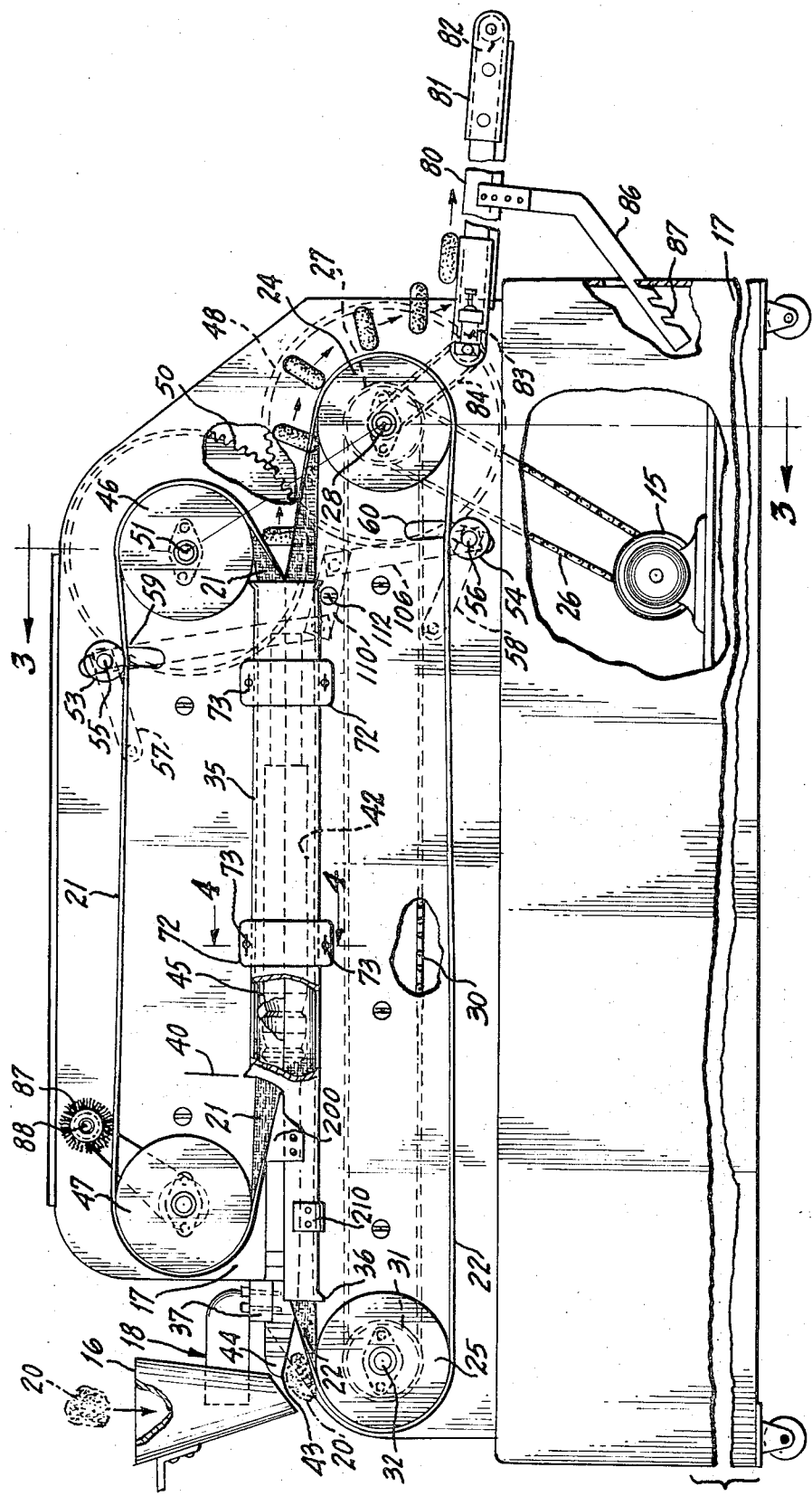
FIG. 2 is a side elevation view of an automatic bagel performing apparatus according to this invention.

Also shown in FIG. 2 is a conveyor assembly 80 which contains a flexible conveyor belt 81. The conveyor belt 81 is directed between two rollers 82 and 83. The roller 83 is driven from a sprocket gear on shaft 28 by means of a chain drive 84. The conveyor 80 can be adjustably positioned with respect to the main frame 17 by means of the arm 86 having a plurality of notches 87 located on the surface thereof. The notches 87 cooperate with the bottom edge of an aperture formed in the machine frame assembly 17. This arrangement provides adjustability of the conveyor belt as one can readily ascertain.

Also shown mounted above conveyor belt 21 is a brush 87. The brush 87 may be rotatably mounted on a shaft 88 which shaft may be further coupled to a gear and be driven by the motor 15 in a direction opposite to the direction of belt travel. In this manner the brush 87, which may be fabricated from a hard bristle material, as driven by the motor, serves to wipe or remove excess dough which may tend to accumulate on the belt 21. The loosened particles of dough may be blown off by means of an air spray or otherwise collected and disposed of. Similarly another brush may be mounted below belt 22 and rotated in an opposite direction to the direction of travel of belt 22 and also be driven to effectuate cleaning of this belt.

Figure 3:
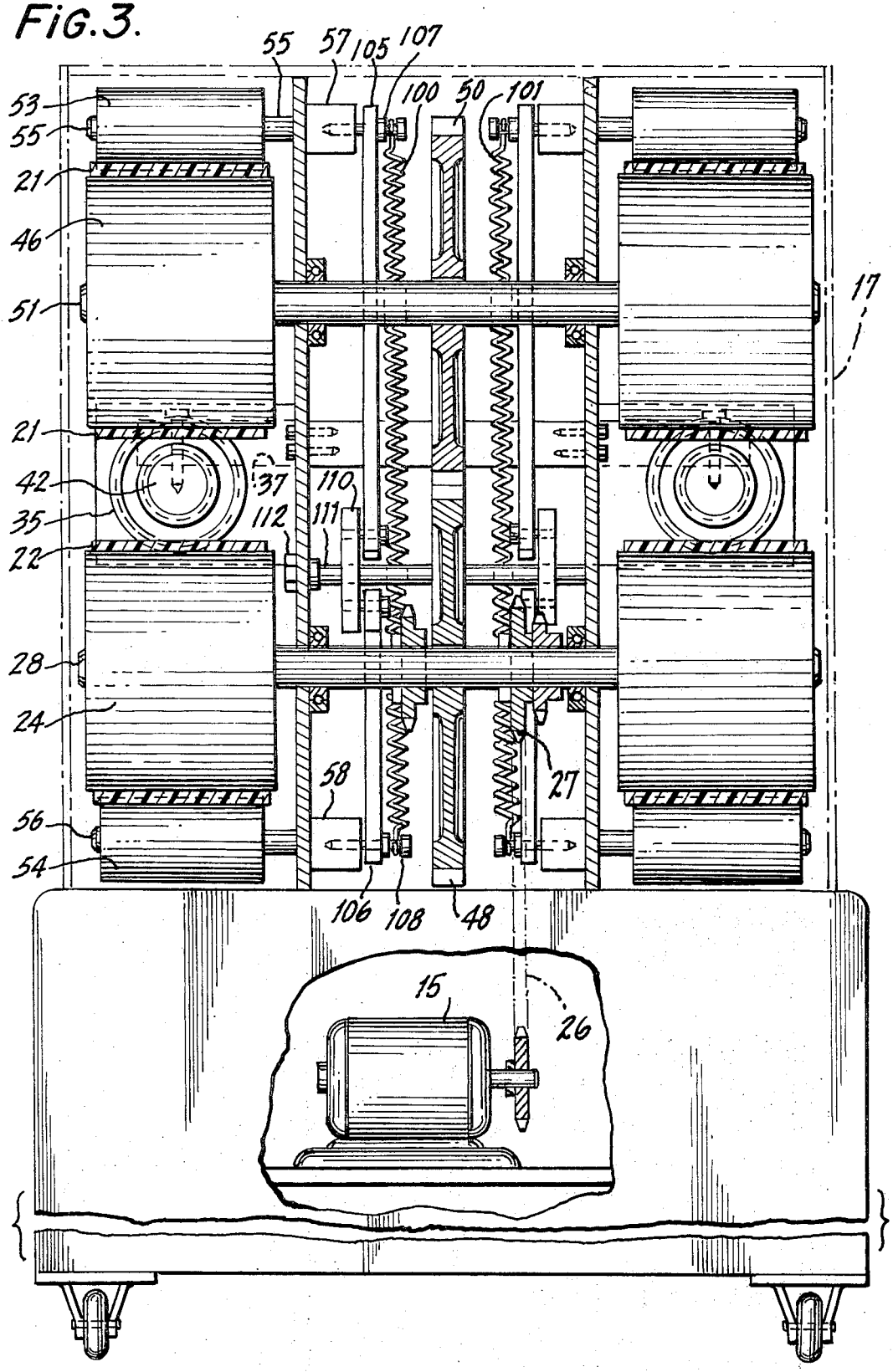
FIG. 3 is a front cross sectional view taken through line 4—4 of FIG. 2.

Referring to FIG. 3 there is shown a front sectional view taken through line 3—3 of FIG. 2. Similar parts have retained identical numerals for ease of explanation. FIG. 3 clearly shows the dual aspect of the apparatus. It can be immediately seen that each part of the asembly as drums 24 and 46, the idler rollers 53 and 54, the cylinder 35 and the mandrel 42, have equivalent counterparts on the other side. It is also seen that the gears 50 and 48 are driven by the motor 15 which serve to drive both the left hand and right hand drum assemblies and the associated belts. Briefly, the drive shafts 28 and 51 are rotatably mounted to the frame and are coupled to and driven respectively by gears 50 and 48. These shafts are coupled to identical drum configurations on the other side of the apparatus which function to drive identical belt transports through a cylinder and mandrel as previously described in conjunction with FIG. 2.

This symmetrical arrangement enables twice the production from one single machine while utilizing a single motor; and hence reduces power consumption as compared to two independent machines.

The view also shows two spring members 100 and 101. These springs are used to tense the idler roller assemblies 53 and 54 and the operation of spring 100 will be described acknowledging that spring 101 functions in a similar manner. As indicated, the tensioning apparatus and release for the idler rollers 53 and 54 include pivotable lever arms 57 and 58 which are coupled to the shafts 55 and 56 of the idler rollers. The movement of the arms and these shafts is constrained within predetermined limits by means of the slots 59 and 60 as shown in FIG. 2. The coupling point of the shaft 55 and the arm 57 is also coupled to control lever members 105 and 106. This is afforded by means of the screw assemblies 107 and 108. The levers 105 and 106 are further coupled to a central lever 110 which is secured at its center point to a shaft 111. The shaft is held in position by means of the bolt 112 which when tightened prevents movement of the central lever 110 and therefore holds the entire assembly in a relatively rigid maintenance position. The normal operating position is determined by the tension of the spring 100 which is coupled between the screw assemblies 107 and 108. Hence, the entire apparatus is tensed by the spring 100 to permit the idlers 53 and 54 to engage the belts with a force determined by the spring 100. Prior to separating the cylindrical member 35B the operator would grasp the bolt 112 by means of a wrench, screwdriver or similar device and thereby tighten the same while turning the shaft 111 such that the bar or lever 110 forces the idler roller 53 upwards. The idler roller 54 would be forced downward due to the movement of the central lever 110. This of course would release the idler rollers from the belts to thereby permit one to separate the cylindrical members without fear of opposing forces due to the tension on the belts 21 and 22.

It can also be seen that the shaft 111 is coupled to another lever arm on the right hand side which lever arm is associated with two identical tensioning means which are used for the opposite side idler rollers. The tension on these belts being provided by the spring 101.

The importance of the above described mechanism is relatively apparent in that the tensing of the belts by means of the idler rollers 53 and 54 and the above associated assembly enables the manufacturer to select belts having relatively wide tolerances in regard to total circumference or length. In this manner a great deal of slack can be provided which slack will be compensated for by the action of the tensioning means. The slack in the belt also enables the maintenance man to remove these belts quite simply and further due to the fact that the drums do not contain any sprocket or gear teeth arrangements. In this manner an operator of such a unit may have more than one set of belts and if the belts become accumulated with dough he can remove the same in a matter of minutes and replace them with new belts. This therefore specifies that the machine will be out of operation for an insignificant interval and will be back in operation with clean parts rapidly. The soiled belts can then be cleaned at the operator's leisure and be used again when required. It is this aspect of such a machine which is of prime importance; namely, the ability of maintaining the same and to have easy access to all the important parts for quick cleaning and easy service.

Referring to FIG. 5 there is shown a front view of the release and idle tension mechanism described in conjunction with FIG. 3. As shown the central lever 110 is coupled to the shaft 111 which may be tightened by means of the bolt 112 in FIG. 3. If tightening is afforded the arm 110 cannot move and therefore the idler rollers 53 and 54 will remain in the position shown. In this position, the idler rollers are at the remotest end of the slots 59 and 60 which corresponds to that end furthest removed from the associated belts. Hence, in this position the idler rollers do not touch or engage the belts. This position, of course, is the position used when one desires to change the belts or for further maintenace of the other machine parts. As soon as the bolt 112 is loosened the action of the spring 100 pulls the idler rollers 53 and 54 in the direction shown by the arrows. This motion is, of course, limited by the slack in the flexible belts 21 and 22; and thus correct tensioning is automatically afforded. The movement of the assemblies described above is enabled by means of the pivots 115 and 116 which couple the levers 105 and 106 to the central lever 110. As indicated previously in conjunction with FIG. 3, the shaft 111 is also coupled to an identical central lever and control levers arrangement used for the similar apparatus on the opposite side of the machine. Thus the symmetrical apparatus shown enables an operator to remove tension from four belts which are included in this automatic bagel forming apparatus, by means of a single adjustment.

THEORY OF OPERATION

The automatic annular or bagel forming appratus operated in the following modes:

BAGEL FORMATION MODE (FIG. 2)

The piece of dough 20 has been precut or preseparated from a batch of dough by means of a cutting machine or separator, such apparatuses being known in the art. The volume and consistency of the dough piece 20 are sufficient to fabricate a conventional sized bagel. The dough piece 20 is introduced into the hopper 16, located so that the bottom opening causes the dough piece 20 to land on the top surface of the bottom conveyor belt 22. The belt 22 forces or propels the piece 20 so that the dough piece is introduced between the underside front portion 43 of mandrel 42 and the belt 22. This underside portion of the mandrel is tapered and has slots 44 machined therein to provide greater frictional forces to permit reliable movement of the dough piece. As one can readily ascertain, the dough is kneaded by this mandrel section and begins to elongate. The belt 22 enters into the front half cylindrical portion of the cylinder 35. The flexible belt 22 thus assuming the shape of the inside periphery of the half cylindrical section of cylinder 35.

This causes the dough to immediately begin to assume a "U" shaped configuration or a half annulus shape.

The U shaped dough piece is thusly propelled along the mandrel 42 until it reaches reference line 40. At this point, the cylindrical member 35 assumes a full circular cross section. The diameter of this cross section determining the outside diameter of the completed annulus or bagel.

The upper flexible belt 21 is introduced into the cylindrical member 35 at the reference line 40 and assumes a semicircular configuration, due to its width and shape of the cylindrical member 35. The width of the belts 21 and 22 are such that they just abutt within the full circular cross section of cylinder 35, to form a comparite circular cross section.

At the juncture line 40 there is also shown a triangular shaped member 200. This member is secured to the outside of the half cylindrical portion of cylinder 35 and functions to prevent dough at the ends of the U shaped piece from falling over the edges of the half cylindrical section; and from preventing dough particles from being introduced into the abutting space between the upper and lower belts 21 and 22 thereby tending to impede belt motion.

The U shaped dough piece is then engaged by both belts 21 and 22 approximately at reference line 40 and is now introduced into the kneading area 45 of the mandrel 42. This area is a series of tapers which causes the almost toroidal dough section to be worked at the abutting edges of the closed U because of the action of the belts within cylinder 35. The kneading section causes the edges or extremeties of the U member to join together. It is noted that while the kneading section shows a series of different diameter flats and taper portions, that this configuration is one of many alternate ways of accomplishing such joints. Another approach would be to use a V shaped notch on the mandrel with a tapered slope in a sidewall of the V. This would cause the ends of the U to overlap and hence join due to the additional kneading. After the dough piece 20 leave the kneading section 42 of the mandrel, it is propelled along a smooth cylindrical surface of the mandrel, where it is further rolled to provide a more uniform and smoother annular surface area. The annular dough ring is then further kneaded along this section to provide a better worked joint between the ends and better and smoother surface areas. This annular member is then directed along a reduced diameter mandrel section wherein the annular member is further kneaded to assure that the central aperture is within a desired diameter, and to further provide smoothing of the surfaces to produce a rounder topological appearance to the toroidal or annular form.

As the annulus of dough emerges from the dough outlet end of cylinder 35 and is cradled in an upright position due to the curvature of belt 22 emanating from the dough outlet end of cylinder 35, as shown in FIG. 2. The annulus is carried in this upright position unit a point on the circumference of drum 24 is reached whereby the annulus or raw bagel falls upon the surface of the conveyor assembly 80. Here the belt 81 transports the same to a locality where the raw bagel may be stored or introduced into an oven and so on. In this manner, the distance the bagel falls is small and no damage is done, while conveyor 80 further assumes that the annulus does not have to be picked up or touched by human hands. It is, of course, apparent that the length of the conveyor can be any suitable length of transport of the bagel to any suitable location.

It is further noted that two such forming apparatus operate simultaneously as indicated and shown in FIG. 3 thereby effectively doubling the production of this machine. The introduction of dough pieces on the two bottom belts of this equipment can be stagered if desired so that two bagels are never discharged from the double apparatus at the same time, but rather are staggered and offset on the belt surface of the conveyor 80.

MACHINE MAINTENANCE MODE

As previously indicated, bagel dough is relatively thick and gummy in nature, and has a propensity for adhering even to the smoothest of machine parts. In regard to this, it is noted that the belts 21 and 22 which are neoprene are relatively smooth and as such cannot easily be coated with dough. This characteristic being considered with the additional brush mechanism 88 which can continuously clean the belts.

The mandrel 42 and cylinder 35 are smoothly machined and fabricated from steel or aluminium and hence also are relatively resistant to dough adherence. But, in any event, after prolonged use such parts may become coated with dough and should be cleaned. This is compatable with pure sanitary procedure as one would also desire to wash the equipment purely for antisepetic reasons after any prolonged use.

The maintenance mode is implemented as follows: The operator merely grasps the head of bolt 112 coupled to shaft 111 (FIG. 2, 3, and 5). This action moves the central lever 111 into the position shown in FIG. 5, thus releasing the idlers, all four, from the four belts. Releasing the idlers immediately removes the tension on the belts.

The operator then merely grasps the wing heads 73 associated with blocks 72 (FIG. 4) and separates the cylindrical half section 35B from section 35A. The belts with their inherent slack are easily removed, the mandrel and cylinder surfaces are exposed and can be easily cleaned and maintained. After this operation, the operator merely tucks the belts into the cylindrical half section 35A, places the section 35B back in place and inserts the screws 73. He then releases the shaft 112, the spring 100 (FIG. 3) forces the idlers against the belts thus tensioning the same while assuring they are positioned within the cylinder.

This completes the operation and the machine is again ready for the bagel formation mode.

Figure 6:
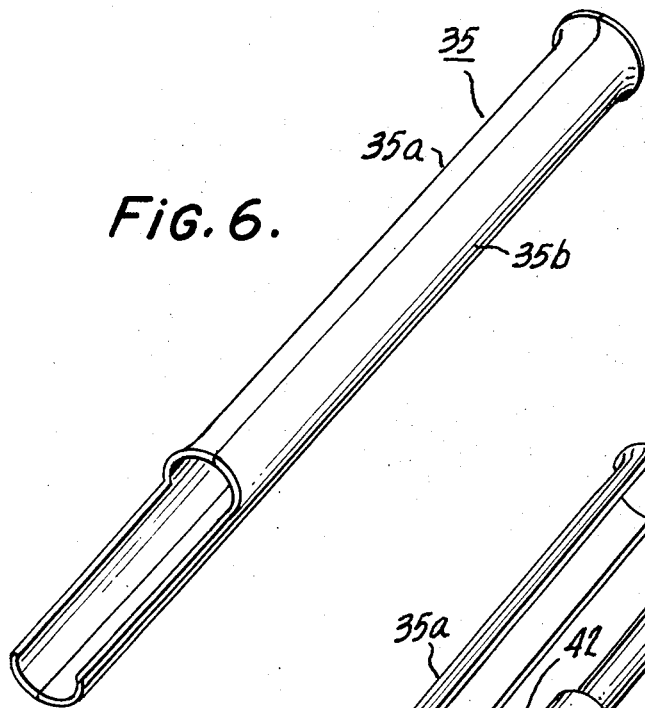
FIG. 6 is a perspective view partly in cross section showing the cylindrical member according to this invention.

Referring to FIG. 6 there is shown the cylindrical member 35 to further clarify the exact shape and its structural nature.

Figure 7:
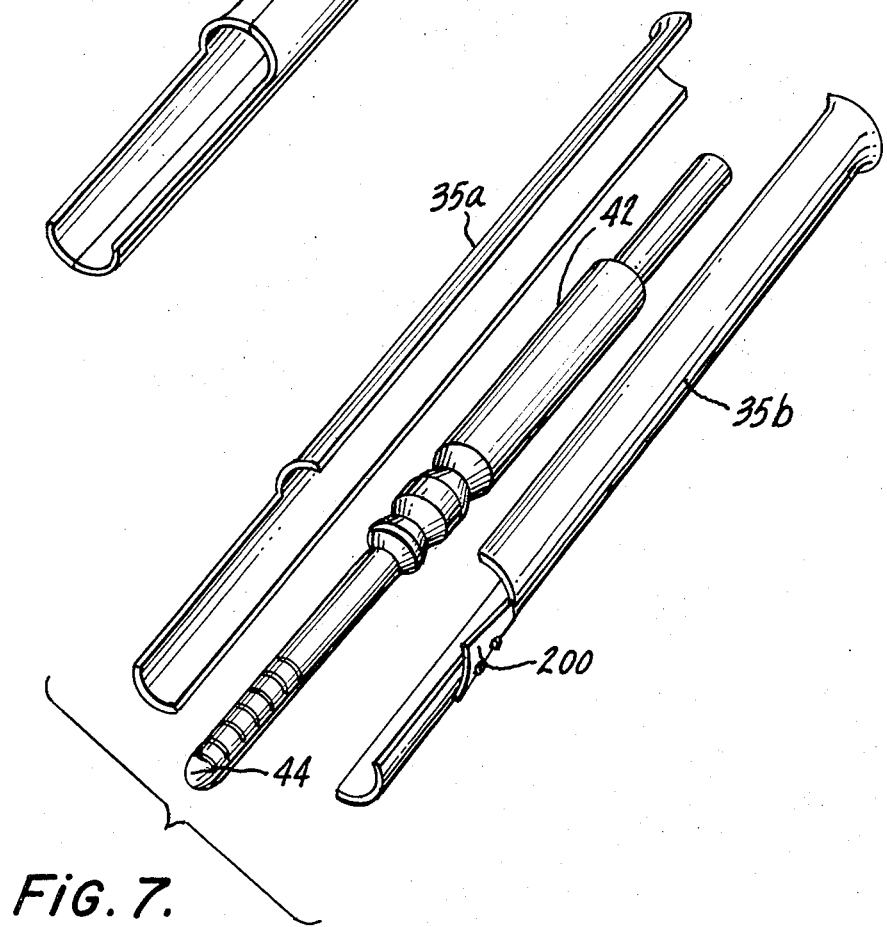
FIG. 7 is a perspective view showing a separated cylinder and a central mandrel.

FIG. 7 shows the cylindrical member separated into sections 35A and 35B and gives a clearer representation of a perspective view of the mandrel 42 together with the exact curvature required for the section 200. Section 200, as indicated, serves to prevent dough from interfering with belt operation and from overlapping the edges of the cylinder.

A few additional comments concerning the characteristics of the bagel forming apparatus will be given.

It has been indicated that the annular ring formed by this apparatus has a central aperture whose diameter is determined by the diameter of the mandrel while the outside diameter of the cylinder surrounding the mandrel. Accordingly, it can be seen that one can obtain a different sized annulus by merely changing the mandrel and/or changing the cylinder. The belts, of course, serve to propel the dough within the cylinder and about the mandrel and as described abut against each other within the cylinder. Each belt forced to assume a semicircular cross sectional configuration. Hence, if one desired to produce a bagel having a larger outside diameter, one would merely change the cylindrical member and change the belts. This entire operation is very rapid as the equipment is relatively simple. Since the mandrel is only supported at one end, (indicated in FIG. 2 the mandrel is coupled to block 37) it is extremely simple to change the mandrel to produce bagels with different diameter central apertures. It is also noted that all gears and other complicated moving parts are completely separated from the drum assemblies and belt assemblies by means of the frame walls, which are clearly shown in FIG. 3. This therefore prevents any dough from ever interfering with the drive parts including the main drive gears 48 and 50 and the associated mechanism. Hence, the parts which have to handly the dough are relatively isolated from any of the above described mechanisms. Since all such parts for handling dough are relatively smooth and are easily assemblied and disassembled, as explained, the apparatus further assures reliability and easy maintenance.

It is, of course, noted that the ability to change the various parts simply to therefore produce different size and dimensioned toroidal configurations has further utility and appeal to the user of such apparatus.

The foregoing description is considered as illustrative only of the principles of this invention. Further, since numerous modifications and changes will readily occur to those skilled in the art, it is not desired to limit the invention to the exact construction and operation shown and described, and accordingly all suitable modifications and equivalents may be resorted to, which fall within the scope and breath of this invention as claimed.

We claim:

1. Apparatus for forming an annulus of dough, comprising,
   a. first and second flexible, continuous conveyor belts, each directed along a different translatory path between two belt accommodating rotatable cylindrical members, said first belt positioned above said second belt and relatively parallel thereto, each belt being of a circumference greater than the length of said translatory path,
   b. a tubular cylindrical member having a first portion of a semicircular cross section and a second portion of a full circular cross section, said second belt directed through said first and second portions to assume said semicircular configuration, said first belt directed only through said second portion to assume an inverted semicircular configuration as compared to said second belt configuration, said first and second belts abutting within said second portion to assume a composite circular configuration determined by said circular cross section of said second portion,
   c. a mandrel symmetrically positioned within the hollow confines of said cylindrical member, to cause a piece of dough introduced on said second belt to be propelled to said second portion of said cylindrical member and then propelled by said first and second belts and shaped by said mandrel and said cylindrical member to form an annulus, and
   d. means for tensioning said belts as directed along said paths to compensate for any slack due to the circumference of said belts being greater than the length of said translatory path.

2. The apparatus according to claim 1 wherein said tubular cylindrical member comprises,
   a. first half cylindrical member and a second mirror image half cylindrical member,
   b. means for selectively joining said first and second members to form said tubular cylindrical member.

3. The apparatus according to claim 1 wherein said mandrel includes a front portion having a taper above said second belt and a plurality of channels on said taper portion to afford a greater effective surface area to aid in propelling said dough piece as introduced on said second belt.

4. The apparatus according to claim 1 wherein said means for tensioning said belts includes first and second idlers, said first idler positioned to cooperate with said first belt and said second idler positioned to cooperate with said second belt, said first and second idlers as positioned further being capable of moving in a direction transverse to said translatory path, and a spring coupled between said first and second idlers to cause them to engage said belts and tense the same to compensate for any slack because of said belts being greater than the length of said translatory path.

5. Apparatus for forming an annulus of dough comprising,
   a. first and second flexible, continuous conveyor belts, each directed along parallel translatory paths, with said first belt positioned above said second belt,
   b. a tubular cylindrical member having a first portion of a given length of a semicircular cross section and a second portion of a greater length having a full circular cross section, said second belt directed through said first portion and said second portion to assume a U shaped configuration, and said first belt directed through said second portion to assume an inverted U shape, said first and second belts abutting within said second portion of said cylindrical member, to assume a composite circular configuration determined by said circular cross section of said cylindrical member, and
   c. a mandrel symmetrically positioned within the hollow confines of said cylindrical member, whereby a piece of dough introduced on said second belt is propelled thereby and thence by both said first and second belts and shaped by said mandrel and said cylindrical member to form an annulus.

6. The apparatus according to claim 5, further comprising,
   a. first and second idlers, said first idler moveably mounted and positioned to interface with said first belt, and said second idler moveably mounted and positioned to interface with said second belt,
   b. spring means coupled between said first and second idlers to move said idlers into contact with the associated belts to apply tension to said belts as directed along said translatory paths.

7. The apparatus according to claim 6, further comprising,
   a. lever means coupling said first and second idlers together said lever means including a first control arm coupled to said first idler and a second control arm coupled to said second idler, said first and second control arms pivotally coupled to a central lever arm, which central arm is rotatably supported at its center point, said configuration of said first and second control arm and said central arm having a greater length than belt interface distance between said first and second idlers, whereby when said central arm is rotated said first and second idlers move away from said belts.

8. In apparatus for forming an annulus of dough, said apparatus including two endless flexible conveyor belts positioned one above the other for propelling dough pieces to engage with a mandrel supported in close proximity to said conveyor to cause said dough as propelled to wrap around said mandrel, in combination therewith apparatus for surrounding a portion of said mandrel comprising,
   a. a tubular cylindrical member having a first portion characterized by a semicircular cross section, said first portion adapted to accomodate one of said belts to cause the same to assume a U shaped configuration and a second portion having a full circular cross section for forming the outside periphery of said dough piece after it has been U shaped; said second portion adapted to accomodate both of said belts whereby said two belts cause said dough piece to surround said mandrel as said dough piece is propelled through said second portion of said cylindrical member by said belts.

9. Apparatus for forming an annulus of dough comprising,
   a. a relatively cylindrical mandrel having a dough receiving front end, including surface channels on the surface of said front end to provide a greater effective area for moving a piece of dough from said dough receiving end to said other end,
   b. first and second continuous conveyor belts, said first belt positioned above said mandrel, and said second belt positioned below said mandrel,
   c. a central cylindrical member positioned to surround said mandrel, said cylindrical member having a dough inlet end closest to said dough receiving end of said mandrel, and a dough outlet end, said cylindrical member having a first portion of a semi-circular cross section and a second portion of a full circular cross section, said first and second conveyor belts both directed through said second portion of said cylindrical member with one of said belts further directed through said first portion of said cylindrical member to force a piece of dough to be driven about said mandrel within said cylindrical member to form a U shaped member,
   d. means located on the surface of said mandrel to cause the ends of said U shaped member to intermesh after said dough has been driven a predetermined length along said mandrel as surrounded by said second portion of said cylinder.

10. The apparatus according to claim 9 wherein said central cylindrical member further comprises,
   a. a first semicylindrical C shaped member and second C shaped member, said second member being the mirror image of said first,
   b. means for selectively securing said first and second C shaped members together at said ends of said C to form said central cylindrical member, capable of being easily assembled and disassembled.

11. In apparatus for forming an annulus of dough, said apparatus of the type including a mandrel supported at one end and operative to cause a piece of dough directed along said mandrel to wrap about said mandrel to form an annular ring at an end thereof, in combination therewith, apparatus for directing said dough piece about said mandrel, comprising,
   a. a cylindrical tubular member, having a first portion of a semicircular cross section and a second portion of a full circular cross section, said cylindrical member positioned to surround said mandrel with said first portion beneath said supported end,
   b. a first continuous, flexible conveyor belt directed along a translatory path, said flexible belt as directed along said path further directed within said first and second portions of said cylinder to propel a piece of dough inserted on said belt along substantially the entire length of said mandrel,
   c. a second continuous, flexible conveyor belt directed along a second translatory path, said second belt further directed along said path only within said second portion of said cylinder to aid in propelling said piece of dough along said mandrel while insuring the same is fully wrapped thereabout, whereby an annulus of dough is formed having a central aperture determined according to a diameter of said mandrel and an outside diameter determined according to the diameter of said second portion of said cylindrical tubular member.

12. The apparatus according to claim 11 further comprising,
   a. tensioning means operative to coact with said first and second belts along said translatory path to maintain a predesired belt tension thereon capable of compensating for any slack in said flexible belts.

13. The apparatus according to claim 11 wherein said cylindrical tubular member is comprised of two symmetrical longitudinal half sections, and means for securing said sections together to form said cylindrical tubular member.

14. The apparatus according to claim 11 wherein said first and second belts are fabricated from neoprene.

15. The apparatus according to claim 11 further comprising,
   a. brush means coacting with the dough accommodating surface of one of said belts to brush particles of dough therefrom.

16. Apparatus for forming a piece of dough into an annulus, comprising,
   a. a frame assembly,
   b. a first drive shaft rotatably mounted on said frame assembly, said shaft having at least one end extending from said frame assembly,
   c. a first belt accommodating drum assembly coupled to said end of said shaft,
   d. a second shaft rotatably mounted at a predetermined distance on said frame from said first shaft, said second shaft having at least one end extending from said drum assembly,
   e. a second belt accommodating drum coupled to said end of said second shaft, f. a mandrel of a given diameter mounted on said frame assembly between said first and second belt accommodating drums, g. a tubular cylindrical member surrounding said mandrel and of a greater diameter than said mandrel, said tubular member having a first portion of a semicircular cross section and a second portion of a circular cross section, h. a first flexible conveyor belt directed about said first drum through said first and second portions of said tubular member and thence about said second drum and back to said first drum to form a continious path, whereby a piece of dough inserted on said belt near said semicircular portion of said tubular member is propelled along said mandrel to first form a U configuration according to said radius of said semicircular portion and thence through said tubular member about said mandrel to form an annulus of dough, and i. a second continuous, flexible belt directed along a second translatory path positioned above said first belt, said second belt directed through said second portion of said cylindrical tubular member to aid in propelling and shaping said dough to form said annulus.

17. The apparatus according to claim 16, further comprising, a. a conveyor assembly coupled to said frame at said outlet end of said cylindrical member for directing an annulus discharged from said cylindrical member to a desired location.

18. The apparatus according to claim 16 further comprising, a. belt tensioning means adapted to coact with said first belt for tensioning the same to compensate for any slack in said belt as directed along said continuous path.

19. The apparatus according to claim 16 wherein said flexible belt is fabricated from an elastomeric material.

* * * * *